Oct. 15, 1963     F. P. GRUENEWALD     3,106,946
CHARGING DEVICE FOR CHARGING PRESSURIZED CONTAINERS
Filed Aug. 4, 1960     3 Sheets-Sheet 3
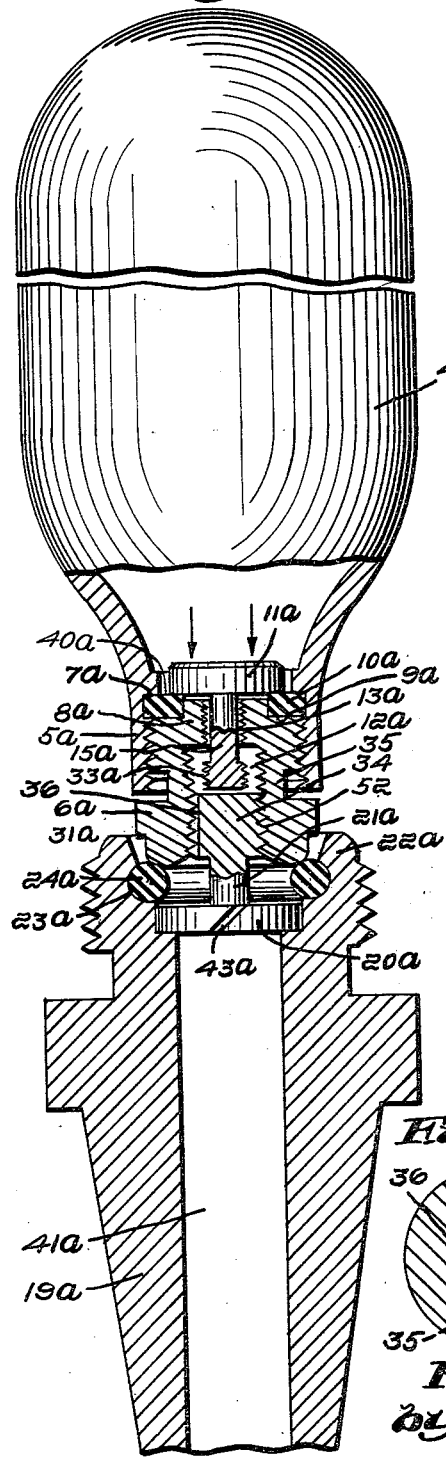
Fig.5.
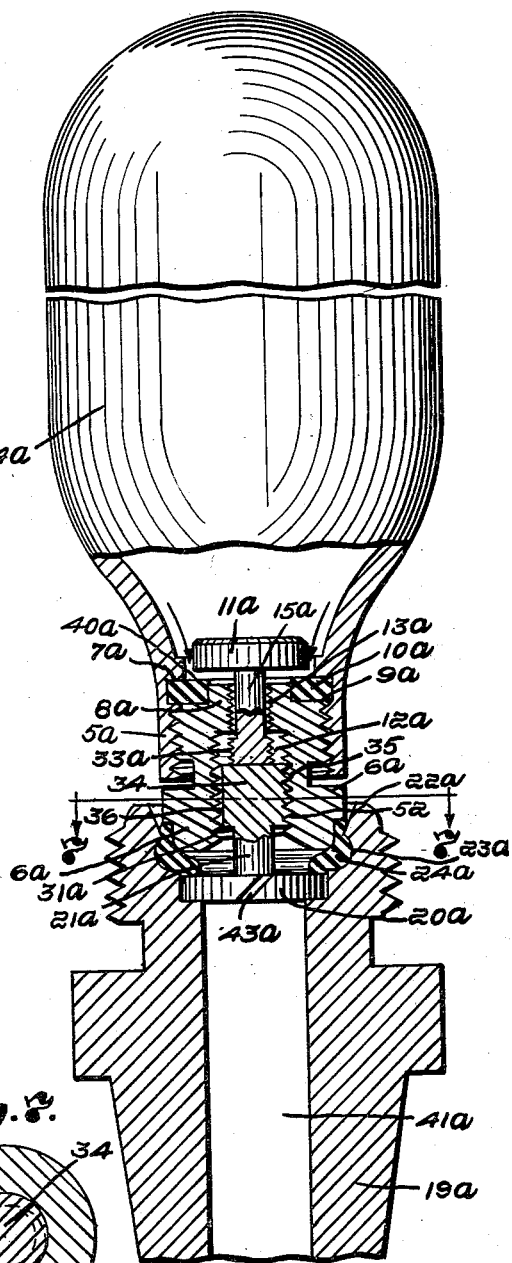
Fig.6.
Fig.7.
Inventor:
Frederick P. Gruenewald,
by Louis C. Smith
Attorney

United States Patent Office
3,106,946
Patented Oct. 15, 1963

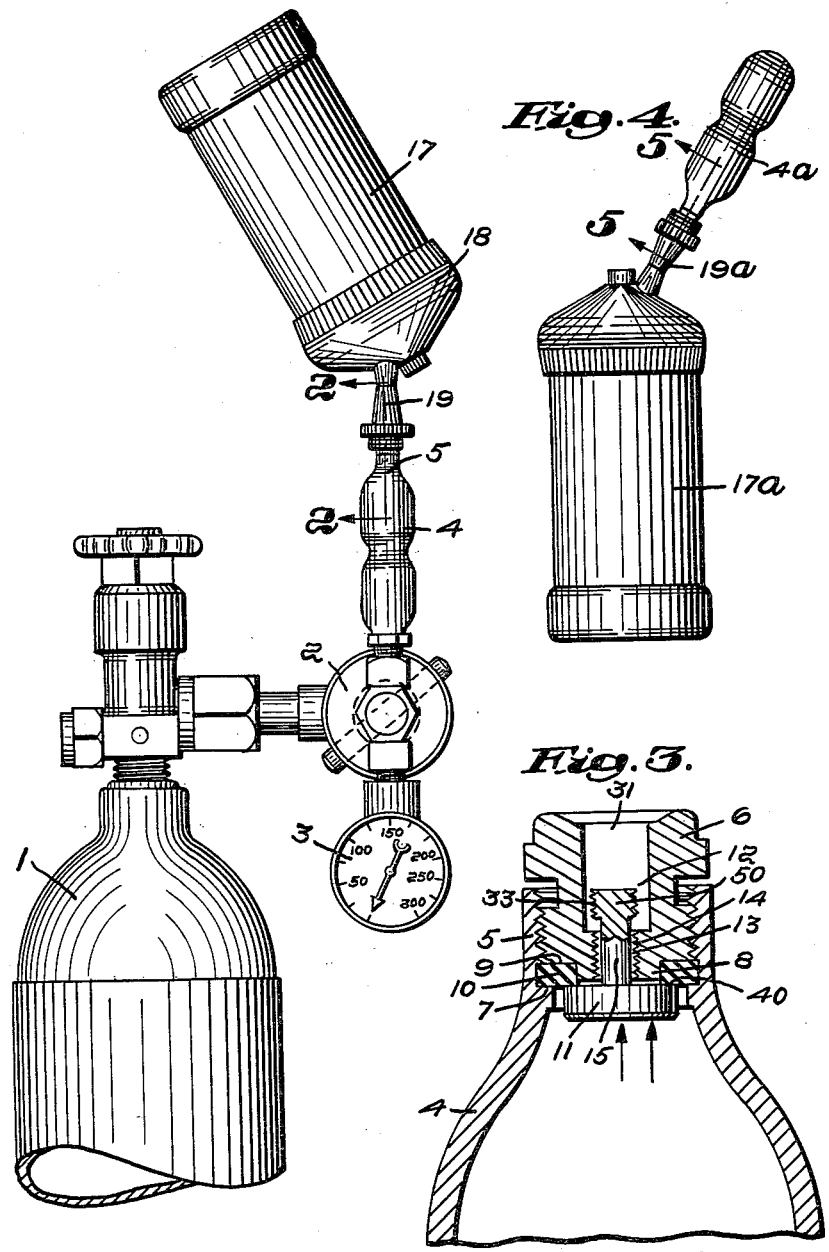

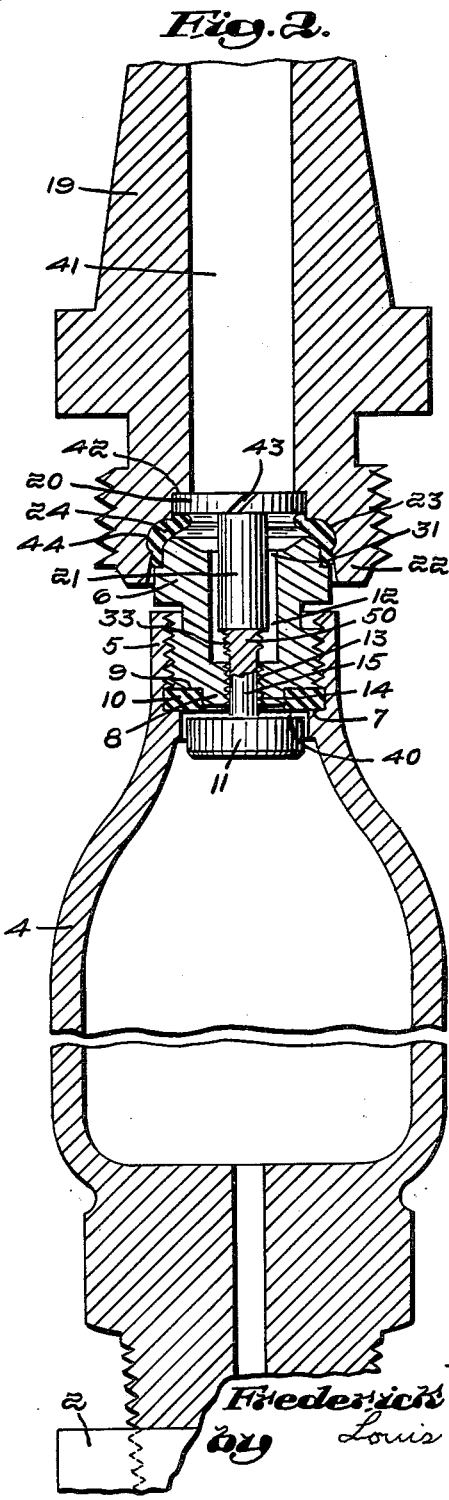

3,106,946
CHARGING DEVICE FOR CHARGING
PRESSURIZED CONTAINERS
Frederick P. Gruenewald, 1 Needhamdale Road,
Needham, Mass.
Filed Aug. 4, 1960, Ser. No. 47,419
8 Claims. (Cl. 141—20)

This invention relates to charging devices for charging pressurized containers with propellant gas so that the contents of the container may be dispensed or discharged under pressure.

Such a charging device is sometimes in the form of individual chargers or "cartridges" as they are sometimes called, each charger having a bottle-like form and containing sufficient propellant gas under pressure to pressurize an individual container.

Such charging devices are also sometimes in the form of a tank containing the propellant gas under pressure and provided with a pressure regulating valve by which the pressure at which the gas is delivered from the tank can be regulated, such regulating valve usually having associated therewith a pressure gauge to indicate the pressure in the tank. When used in connection with this type of charging device, the "cartridge" or charging element embodying my invention may be mounted on the regulating valve in such a manner that said charging element is continuously filled with propellant gas under a pressure determined by the regulating valve.

In using the charging device of the first type, an individual charger is connected to the end of the charging arm of the container to be charged and the contents of the individual cartridge is delivered into the container thereby to pressurize it.

In using the second type of charging device, the charging arm of the container to be pressurized is detachably connected to the end of the stationary cartridge which in turn is connected to the regulating valve thereby to provide for delivering propellant gas under pressure from the tank into the container.

As stated above, a charging element made in accordance with the invention may be embodied in either type of pressurizing device.

Many of the objects and attendant advantages of this invention will readily be appreciated as the invention becomes better understood by reference to the following detailed description when considered in connection with the accompanying drawings, wherein:

FIG. 1 illustrates a container being charged with propellant gas by means of one type of a charging element embodying the invention herein described;

FIG. 2 is an enlarged sectional view on the line 2—2, FIG. 1, showing the position of the parts during the charging operation.

FIG. 3 is an enlarged sectional view of the neck portion of the charger element shown in FIG. 1 with the valve closed;

FIG. 4 illustrates a container being charged by a charging element of the individual type embodying the invention and which contains only sufficient propellant gas to charge a single container;

FIGS. 5 and 6 are enlarged sectional views on the line 5—5, FIG. 4; and

FIG. 7 is a section on the line 7—7, FIG. 6.

A pressurizing device of the second type above referred to is illustrated in FIG. 1 in which 1 is a tank containing the propellant gas under pressure and 2 is a regulating valve that regulates the pressure of the gas delivered from the tank, said regulating valve having a pressure gauge 3 associated therewith. In this construction, the charging element is shown at 4, and it is in the form of a bottle-like container which is connected to the regulating valve in such a way that the container 4 continuously contains propellant gas under the desired pressure.

The charging element 4 is provided with an interiorly screw-threaded neck portion 5 into which is screwed a closure element 6. The neck portion 5 is provided below the screw threads with an upwardly facing, inwardly projecting shoulder 7. The inner end 8 of the closure element 6 is reduced in diameter and thus provides a downwardly facing shoulder 9 at the inner end of the closure element, the construction being such that the downwardly facing shoulder 9 is located above the upwardly facing shoulder 7. A sealing ring 10 encircles the portion 8 of reduced diameter of the closure element 6; and when the closure element is screw-threaded into the neck of the charging element 4, the sealing ring 10 is clamped between the two shoulders 7 and 9, thereby sealing the joint between the body of the container and the closure element 6. This sealing element is so formed that the underface 40 thereof remains exposed on the underside of the closure element.

A valve 11 is located below the closure element and in a position to seat against the exposed face 40 of the sealing ring 10. When the charging element is filled with gas under pressure, said valve will be held by such pressure against the sealing ring as shown in FIG. 3, thus making a leakproof joint.

The closure element 6 is provided with an interior chamber 12 and with an opening 13 extending axially through the reduced portion 8 thereof and communicating with said chamber, said opening being provided with interior screw threads as shown at 14. The valve 11 is provided with a valve stem 15 which extends through the opening 13 and into the chamber 12, and the end 50 of the valve stem within the chamber is enlarged slightly and is provided with exterior screw threads 33 which mate with the screw threads 14 of the opening 13. In assembling the valve 11 with the closure element 6, the screw-threaded end 50 of the valve stem 15 is screwed through the opening 13 until said end is located entirely within the chamber 12. The valve stem is long enough so that when its screw-threaded end is thus located within the chamber 12, the valve is capable of having sufficient free movement toward and from the exposed face 40 of the sealing ring to provide its necessary opening and closing action. The screw-threaded end 50 of the valve stem together with the screw-threaded opening 13 serves as means for retaining the valve connected to the closure element while permitting the valve to have its opening and closing movement. Under normal conditions, when the charging element 4 is not being used, the valve 11 is held tightly against its seat 40 by the pressure of the propellant gas within the said charging element, as seen in FIG. 3.

The chamber 12 of the element 6 is open at its upper end as shown at 31. The purpose of this opening will be presently described. A container which may be charged with this charging unit is shown in FIG. 1, and it includes a body member 17 provided with an interior chamber and a removable cap 18 which has a tubular charging arm 19 extending therefrom. The passage 41 through said arm (see FIG. 2) is connected with the interior chamber of the body 17, and said charging arm 19 is provided at its outer end with a pin-like projection 21 which projects beyond its end. Said pin-like projection 21 has at its inner end a head portion 20 which fits in a recess 42 of the charging arm 19 with a press fit. Said head 20 is provided with one or more openings 43. The charging arm 19 is provided with an internal groove 44 located in front of the head 20 to receive a sealing ring 24, and also with a rim or wall 22 at its extremity beyond said sealing ring.

When the container 17 is to be charged with propellant gas by the charger 4, said container is held in an inverted position as shown in FIG. 1 with the end of its charging arm 19 in a vertical position over the charger and with the pin-like projection 21 directly over the opening 31 in the closure element 6 of the charger. The container is then moved downwardly to cause the pin-like projection 21 to enter and pass through the opening 31 and to bring the end of the closure element 6 against the sealing ring 24. By applying downward pressure on the container, the sealing ring 24 will be distorted somewhat as shown in FIG. 2, thereby sealing the joint between the closure element 6 and the charging arm 19 and also bringing the end of the pin-like projection 21 against the valve stem 15 thereby opening the valve 11 as shown in FIG. 2. The opening of the valve 11 allows propellant gas to be discharged from the charging element 4 through the opening 13, the chamber 12 and the open end 31 thereof, and through the opening or openings 43 in the head 20 of the pin 21 of the charging arm 19 and thence into the passage 41 of said arm and into the container 17.

When the charger 4 and charging arm 19 are in the relative positions shown in FIG. 2 the end of the closure element 6 is spaced from the head portion 20 of the pin-like projection 21 thus providing free movement of the propellant gas from the chamber 12 through its open end 31 and through the space between the closure element 6 and the head portion 20 of the pin 21 and then through the openings 43 into the passage 41 of the charger arm 19.

In using this device, the pressure regulating valve 2 may be set to provide the pressure within the charging element 4 that is required in the container; and when the pressure in the container has been built up to equal that in the charging element, then the container is disconnected from the charging arm and the valve 11 will be automatically seated against the sealing ring 10 by the pressure of the gas within the charging element, thereby to prevent any leakage of gas through the closure element.

It will be understood, of course, that the container includes in its construction a valve (not shown) which is normally held in a closed position by the pressure in the container but which can be manually opened when it is desired to disperse some of the contents of the container. One such valve is shown in my copending application Serial No. 33,689 filed June 3, 1960, now Patent No. 3,064,696, issued November 20, 1962. Since the present invention is not concerned with any particular type of dispensing valve, it is not thought necessary to illustrate such a valve.

The above description refers to a charging device embodying the invention and of the type in which the charging element is connected to a tank containing the propellant gas and is, therefore, continuously filled with gas, and which is intended to be used for charging any number of containers successively.

As stated above, my invention may also be embodied in the type of charging device referred to as an "individual charger" in which each charging element contains sufficient gas under pressure to charge a single container only. Such an embodiment of the invention is illustrated in FIGS. 4, 5, and 6 in which the charging element is designated 4a and is constructed substantially the same as the charger element 4 illustrated in FIGS. 1–3. Said individual charging element includes a bottle-like member 4a having an interiorly screw-threaded neck 5a, a closure element 6a screw threaded into said neck and having a reduced inner end 8a carrying a sealing ring 10a which is clamped between an interior shoulder 7a of the charger body and a shoulder 9a formed on the closure element, an inwardly opening valve 11a seated against the exposed face 40a of the sealing ring 10a and having a valve stem 15a extending through an opening 13a in the inner end of the closure element 6a, and into a chamber 12a within said closure element 6a, said chamber being open at the outer end of the closure element as shown at 31a. The above parts of the embodiment of FIGS. 4, 5, and 6 which are duplicates of parts shown in FIGS. 1–3 have the same reference numerals applied thereto as in said FIGS. 1–3 except that in the embodiment of FIGS. 4, 5, and 6 each reference numeral carries the exponent "a.".

In the construction shown in FIGS. 4, 5, and 6, however, the chamber 12a is interiorly screw threaded as shown at 52 and the pin 21a which projects from the end of said charging arm 19a has an enlarged end 34 which is provided with exterior screw threads 35 that mate with the interior screw threads 52 of the chamber 12a. In using this type of charger, the closure element 6a of the charger body 4a is screwed onto the screw-threaded portion 34 of the pin 21a of the charger arm 19a, which operation draws the charger towards the charger arm and also advances the end of said pin 21a toward the end of the valve stem 15a which is located in the chamber 12a. By the time the charging element has been advanced into the position shown in FIG. 5, the end of the closure element 6a will be brought against the sealing ring 24a, and the end of the pin-like projection 21a will be advanced to a position nearly in contact with the end of the valve stem 15a. By giving the charger 4a further turning movement, the end of the closure element 6a will be pressed tightly against the sealing ring 24a, thus making a tight joint, and the end of the pin-like projection 21a will be brought against the end of the valve stem 15a thereby forcing valve 11a backwardly into an open position as shown in FIG. 6. As soon as said valve 11a has been opened, the high pressure gas within the charging element 4a will pass through the opening 13a into the chamber 12a and through its open end 31a into the space between the closure element 6a and the head portion 20a of the pin-like projection 21a and through the openings 43a into the passage 41a of the charging arm 19a and thus into the container 17a, thereby pressurizing it. In order to provide a free flow of the gas from the charger element 4a through the chamber 12a the screw threads 35 on the pin 21a are filed off on one side thereof as shown at 36.

After said container has been pressurized, the charger 4a will be unscrewed from the pin 21a and may be refilled for use in charging another container. The openings 43 and 43a are preferably in the form of slots cut in the edge portion of the heads 20 and 20a, and in the drawings said slots are shown as cut at an angle to the vertical. An advantage of this is that when material such as whipped cream is being dispensed from a pressurized container, the passage of such material through the inclined slots under pressure tends to fluff it up and thus improve its condition for application to various food products.

I claim:

1. A valved charging mechanism for transferring gas under pressure to a container, said mechanism including an interiorly screw threaded neck section having a closure element in cooperative engagement therewith, sealing means retained in an annular recess of said neck section and in abutting relationship with a portion of the lower surface of said closure element defining a valve seat, said closure element having a chamber containing an enlarged end of a valve stem, said stem extending through a valve stem receiving opening in the closure element terminating in a valve disc which is disposed within the neck section and seated by the pressure against the sealing means, said valve adapted for axial movement between predetermined limits in response to pressure exerted therein by pin means integral with said container whereby gas is permitted to flow to said container.

2. A valved charging mechanism as defined in claim 1 in which the valve stem receiving opening through the inner end of the closure element is interiorly screw threaded and the end of the valve stem within said chamber is exteriorly screw threaded with screw threads which mate the interior screw threads of said opening.

3. A valved charging mechanism for charging a pressurized container as defined in claim 1 in which the closure element is provided with a downwardly facing shoulder and the sealing ring is clamped between the downwardly facing shoulder of the closure element and an upwardly facing shoulder of the charger body thereby to seal the joint between said body and the closure, said sealing ring being exposed below the closure and constituting a valve seat.

4. A valved charging mechanism for charging a pressurized container as defined in claim 1 in which the closure element has a reduced diameter on which the sealing ring is mounted and which provides a downwardly facing shoulder that cooperates with an upwardly facing shoulder of the charger to clamp the sealing ring in its operative sealing position.

5. The combination with a container to be charged and having a charging arm provided at its end with a pin-like projection, of a charger for self charging said container, said charger having a bottle-like body provided with an interiorly screw-threaded neck portion and an interior upwardly facing annular shoulder below the screw threads of the neck, a sealing ring carried by said closure element and engaging said annular shoulder and sealing the joint between said closure element and said neck, the bottom face of said sealing ring being exposed below the closure element and constituting a valve seat, said closure element having an interior chamber and an opening through its inner end which communicates with said chamber, a valve element at the end of said closure element and seating against the exposed face of said sealing ring, said valve element having a valve stem extending through said opening and into said chamber and provided at its end with means which cooperates with said closure element to retain said valve stem within said opening while permitting an opening and closing movement of the valve, said closure element also having a second opening to said chamber through its outer end and of a size to receive the pin-like projection at the end of said charging arm, whereby when the end of the charging arm and the end of the charger having the closure element are brought into cooperative relation with said pin-like projection occupying said second opening in the closure element, said valve will be opened by the engagement of said pin-like projection with the valve stem to allow gas under pressure from the charger to be delivered into the container through the charging arm, and means to seal the joint between the charging arm and the charger while the gas is thus being delivered.

6. A valved charging mechanism for transferring gas under pressure to a container comprising a tubular neck section having an inwardly extending annular flange, a closure member adapted to fit into said tubular neck section and having a shoulder formed on the inner end thereof, said shoulder having an outer diameter greater than the inner diameter of said flange and an inner diameter substantially less than the inner diameter of said flange, an annular sealing gasket carried on said shoulder and having inner and outer diameters corresponding to the inner and outer diameters of said shoulder, a disc valve carried by said closure member and axially movable to bear against said gasket, said disc valve having a diameter greater than the inner diameter of said gasket and less than the inner diameter of said flange, a stem on said disc valve extending through said closure member for displacing said disc valve axially away from said gasket to open the seal formed by said disc valve against said gasket, and means for securing said closure member within said tubular neck section with said shoulder compressing said gasket against said flange to form a continuous peripheral seal.

7. Rechargeable pressurized dispensing means comprising a rechargeable container; a charging conduit projecting from said container and terminating in a recessed guideway communicating with said conduit; a pin extending axially in said guideway; a charging nozzle connected to a source of charging gas under pressure, said nozzle having an interior annular flange; a closure member having an axial bore and having an annular shoulder at one end thereof; a sealing ring carried by said shoulder, said closure member threaded into said charging nozzle to a position where opposed portions of said flange and said shoulder compress said sealing ring to seal the threaded engagement of said nozzle and closure against leakage of said gas, said sealing ring projecting radially inwardly beyond said flange to provide a resilient valve seal, a disc valve having an axial stem extending into said bore and secured to said closure member for axial movement to seat against said resilient valve seat due to the pressure of said gas, a tubular extension projecting beyond the end of said charging nozzle and freely mating with said guideway, said extension having a rounded bearing surface complementary to a corresponding annular surface in said guideway, and an O-ring seal in said guideway compressible between the surface of said tubular extension and the interior walls of said guideway, said pin and said axial stem being of total length to open said disc valve when said O-ring is compressed.

8. Dispensing means according to claim 7 in which said tubular extension has an outwardly projecting annular flange, said flange having an outer diameter small enough to fit into said guideway and being recessed from the end of said tubular projection to a position where said outwardly projecting flange axially compresses said O-ring when said charging nozzle and said guideway are coupled together in gas transfer relation.

References Cited in the file of this patent

UNITED STATES PATENTS

| | | |
|---|---|---|
| 2,679,140 | Burchett | May 25, 1954 |
| 2,680,546 | Seaberg | June 8, 1954 |
| 2,708,347 | Cameron | May 17, 1955 |
| 2,841,190 | Scheck | July 1, 1958 |
| 2,857,937 | Ayres | Oct. 28, 1958 |

FOREIGN PATENTS

| | | |
|---|---|---|
| 1,227,311 | France | Mar. 7, 1960 |